June 18, 1963      E. M. GLUHAREFF      3,093,962

VALVELESS JET ENGINE WITH INERTIA TUBE

Filed March 11, 1957

EUGENE M. GLUHAREFF
INVENTOR.

BY

United States Patent Office 3,093,962
Patented June 18, 1963

3,093,962
VALVELESS JET ENGINE WITH INERTIA TUBE
Eugene M. Gluhareff, 513 N. Dianthus,
Manhattan Beach, Calif.
Filed Mar. 11, 1957, Ser. No. 645,229
8 Claims. (Cl. 60—35.6)

My present invention relates to jet engines, and it relates principally to jet engines that are particularly designed for use as power units for driving helicopter blades but which are, however, not necessarily limited to this use.

It has long been a problem in the art to provide a jet engine for driving helicopter blades which is simple in construction, light in weight, provides a large amount of thrust, and which has a long and dependable service life. It has also long been a problem in the art to provide such a jet engine which is not critical in operation, and hence which is not likely to cease operating during flight.

One prior art attempt to provide such a jet engine particularly adapted for driving helicopter blades was the valve type of pulse jet engine. This prior art engine employed an intake valve which closed upon explosion of the fuel in the engine, and which then re-opened to admit more of the fuel mixture because of the inertia of the leaving column of hot gasses through the exhaust pipe.

This prior art valve type of pulse jet engine had several serious disadvantages. First, the fuel to air ratio was highly critical, with either a "lean" or a "rich" blowout occurring on either side of a narrow power range.

Another disadvantage of this prior art valve type of pulse jet engine was that the valve member had a relatively short service life.

A further disadvantage of the valve type pulse jet engine was that it was difficult to start, requiring compressed air which was not always available.

In view of these substantial disadvantages of the valve type of pulse jet engine, the valveless pulse jet engine was developed. In the valveless pulse jet engine the fuel was continuously injected into the combustion chamber, with intermittent explosions being obtained sonically by providing an intake and diffuser section as a quarter-wave length oscillator equivalent to the oscillator formed by the combustion chamber and exhaust duct. The returning shock waves from these two oscillators produced the desired pulsation or periodic detonations of the fuel and air mixture.

The first type of valveless pulse jet engine included intake, combustion and exhaust zones that were on a common longitudinal axis. However, a later type of valveless pulse jet engine had an intake zone which was normal to the combustion and exhaust zones, to more thoroughly intermix the fuel and air, and to divert the blow-back, thereby eliminating its braking effect.

In these valveless pulse jet engines the intake pipe and tail pipe lengths had to be accurately related, with the hotter tail pipe being the longer, so that the shock wave from each explosion in the combustion zone would echo at the flare at the end of the intake pipe and the tail pipe, the echoing shock waves meeting in the center of the combustion zone to cause compression which would ignite the fuel to cause another explosion.

In addition to requiring this accurate relationship between the tail pipe and the intake pipe, the valveless type of pulse jet had the disadvantage of being very noisy, with resulting vibrations that were extremely hard on the sheet metal shell of the engine, and particularly on the seams. This required a much heavier engine construction than was desired, and nevertheless tended to cause cracks, holes and the like at various points in the engine shell. Because of the critical tuning of the shock waves in this valveless pulse type of jet engine, any small hole, crack or the like would ruin the tuning of the engine, causing the engine to quit.

In view of these and other problems in the art, it is an object of my present invention to provide a valveless jet engine which does not rely upon the tuned, returning shock waves of the pulse type jet engine for its operation, and which is therefore relatively quiet and uncritical in its operation, permitting a relatively light weight engine shell to be employed without likelihood of dangerous cracks or holes appearing in the shell, and with a substantial increase in performance being provided over the prior art valve and valveless pulse jet types of engines.

Although my present invention appears to have the same general, overall form of my prior valveless pulse type of jet engine, shown and described in my prior application Serial No. 361,113 for "Pulse Jet Engine," filed in June 1953, now abandoned, this similarity is entirely superficial. Thus, according to my present invention, the parts are arranged to eliminate as much of the noise as possible, as noise is in no way helpful to the operation of present invention, but actually hinders its operation. In contrast, my prior "Pulse Jet Engine" described and claimed in said prior application Serial No. 361,113, depended for its operation on the echoing noise shock waves from the tuned intake and exhaust pipes.

The manner in which I provide efficient jet operation without either a valve member or sonic pulsations will be apparent from the following detailed description and claims, the novelty of my present invention consisting in the features of construction, the combination of parts, the novel relations of the members and the relative proportioning, disposition and operation thereof, all as is more completely described herein and as is more particularly pointed out in the appended claims.

In the accompanying drawings, forming a part of my present specification:

Figure 1:
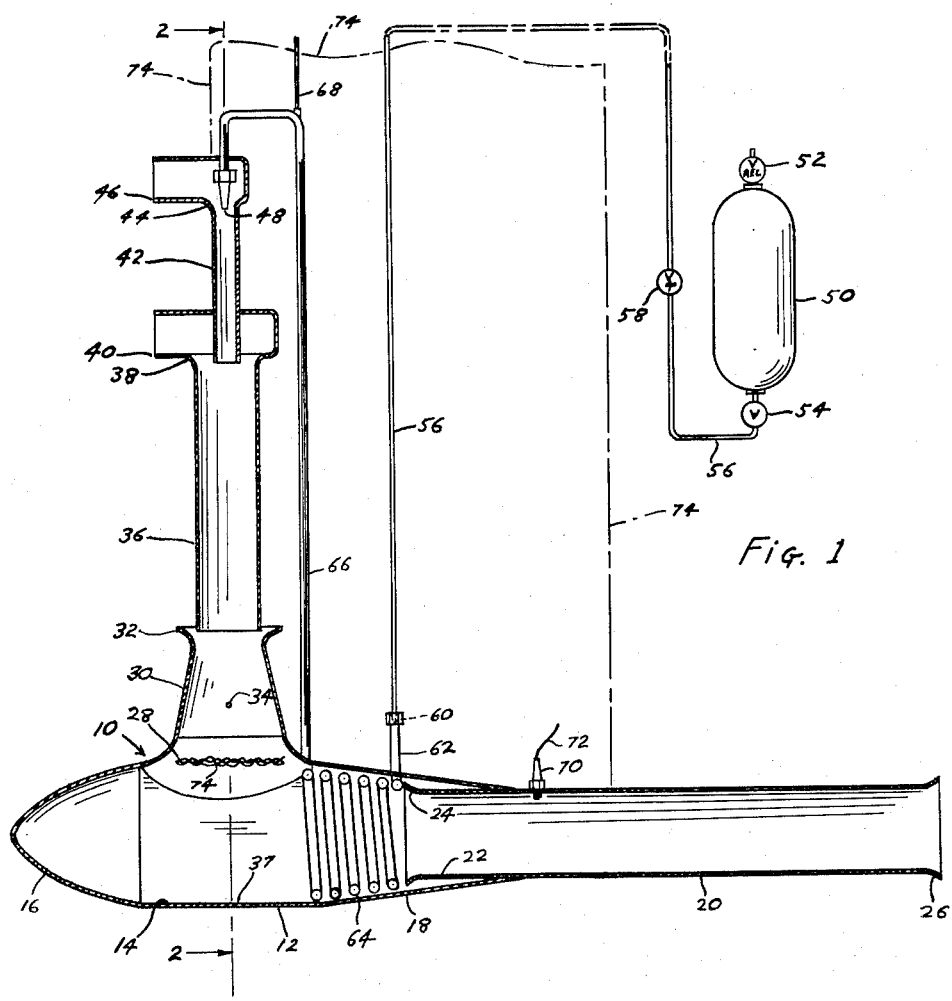
FIGURE 1 is a horizontal section showing my complete jet engine, with an associated helicopter blade in phantom.
Figure 2:
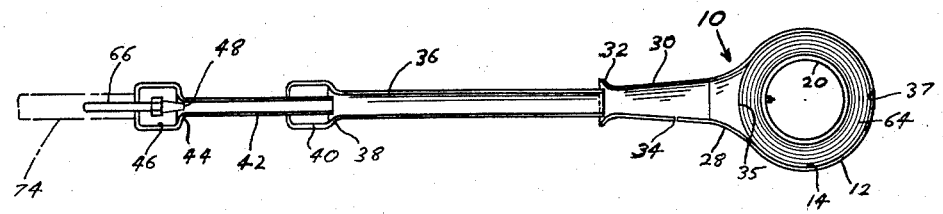
FIGURE 2 is a vertical section of my jet engine taken along line 2—2 in FIGURE 1.

Referring to my drawings, my jet engine 10 includes a combustion chamber shell 12 which encloses the combustion chamber 14, which preferably has a generally circular cross-section, as is apparent from FIGURE 2.

A tapered, closed nose section 16 is integral with the combustion chamber shell 12, and closes off the forward end of combustion chamber 14.

The combustion chamber shell 12 is provided with a tapered rear section 18, which is integrally connected at its rear end to a cylindrical tail pipe 20. The tail pipe 20 is mounted in the tapered rear section 18 of shell 12 in such a manner that a substantial forward portion 22 of tail pipe 20 extends forwardly into the tapered rear section 18 of shell 12, for a purpose that will hereinafter become apparent. I prefer to provide a flare 24 at the forward end of tail pipe 20.

I also prefer to provide a flare 26 at the rear end of tail pipe 20, this flare 26 being entirely for the purpose of providing structural reinforcement to the tail pipe 20 so that the tail pipe 20 will not become egg-shaped due to centrifugal force caused by rotation of the engine on a helicopter blade, and so that the tail pipe 20 will not become mis-shapen due to any forces from unwanted noise.

A diffuser skirt 28 is integrally connected to the side of combustion chamber shell 12, being smoothly contoured into the combustion chamber shell 12, and a diffuser member 30 is integrally joined to the other end of diffuser skirt 28, being smoothly contoured into the diffuser skirt 28. Diffuser 30 and diffuser skirt 28 extend at right angles to the axis of combustion chamber shell 12.

The outer end of diffuser 30 is preferably provided with a flare 32.

I provide a small hole 34, which is preferably within a range of from .020 to .040 inch in diameter, with a preferred diameter of .030 inch, through the wall of diffuser 30. Hole 34 is preferably about half way from the inner wall 35 of combustion chamber 14 to the end of diffuser 30, with a preferred tolerance of plus or minus (+ or −) ¼ inch from this point.

The purpose of hole 34 is to destroy or minimize the noise or shock pressure from the combustion chamber 14 to reduce interference with the incoming fuel and air mixture which is introduced into the combustion chamber 14 through diffuser 30 and diffuser skirt 28. The operation of hole 34 will be more fully explained hereinafter.

I provide a second supercharger stage 36 which comprises a tubular member axially aligned with diffuser 30 and having its outer end slightly within the flare 32 of diffuser 30. I have found in practice that the cross-section area of second supercharger stage 36 is preferably between seventy-five (75%) and one hundred (100%) percent of the cross-sectional area of the throat of the diffuser or third supercharger stage 30. The second supercharger stage 36 and the diffuser or third supercharger stage 30 may, alternatively, comprise a single tubular member, with openings provided where flare 32 is located.

I have found experimentally that in order for my present invention to properly function, the length of second supercharger stage 36 must be at least substantially equal to the distance from the outer wall 37 of chamber 14 to the open end of diffuser or third supercharger stage 30, with a preferred tolerances of between plus or minus ⅟₁₆ of an inch.

The second supercharger stage 36 acts as an inertia tube, the momentum of the gaseous combination of air and fuel passing through tube 36 overpowering the shock or pressure reversals in the third supercharger stage 30 which tend to stop the flow of fuel and air into the third supercharger stage 30. This operation of second supercharger stage 36 is an inertia tube or flywheel is more fully explained hereinafter. The second supercharger stage 36 also serves to further mix the air and gaseous fuel.

The inner end of second supercharger stage 36 terminates in a flare 38, communicating with a scoop 40 which is directed forwardly to receive air under pressure as the jet engine travels in a forward direction.

The first supercharger stage 42, which is essentially a mixing tube, is axially aligned with second supercharger stage 36 and with third supercharger stage 30, the outer end of the tube 42 terminating slightly within the inner end of the second supercharger stage 36. Since the first supercharger stage 42 is merely a mixing duct, it has a length that is preferably between seven (7) and nine (9) times its effective diameter.

First supercharger stage 42 terminates at its inner end in a flare 44, communicating with a scoop 46 that is similar to the scoop 40.

Fuel in its gaseous state is injected into the inner end of first supercharger stage 42 through injection nozzle 48.

The fuel used in my present invention is liquid propane, which is stored in suitable fuel tank 50, which has a conventional safety valve 52 at its top. The bottom of fuel tank 50 communicates through a conventional shut-off valve 54 with a liquid fuel line 56, having a conventional throttle valve 58 therein.

My present invention operates solely on propane, which is provided in tank 50 in the liquid state. The liquid propane is held under a normal pressure of between ninety-eight (98) and one hundred (100) pounds per square inch within fuel tank 50 by the pressure of the propane gas in tank 50 above the liquid propane.

Thus, when valves 54 and 58 are open, liquid propane is forced under a pressure of between about ninety-eight (98) and one hundred (100) pounds per sqaure inch through the liquid fuel line 56, and thence through a spray nozzle 60 which pulverizes the liquid propane, into a larger fuel line 62 which passes through the wall of shell section 18 and is coiled inside of the engine shell section 18 to provide a plurality of superheater coils 64. The superheater coils 64 are disposed just forward of the forward end of tail pipe 20, and are disposed adjacent to the inner wall of the engine shell section 18.

The forward end of the coil 64 is disposed about where the diffuser skirt 28 commences, and a fuel line 66 extends from the forward end of coils 64 outwardly through the engine shell 12 or 18, communicating with the injection nozzle 48.

A nozzle pressure pickup line 68 is operatively connected to the gas fuel line 66 near the nozzle 48, and is connected at its other end to a pressure gauge instrument (not shown) to be observed by the operator.

By pulverizing the liquid propane from line 56 into the larger line 62, and passing the propane through the heating coils 64 disposed directly to the rear of the combustion chamber 14 within the jet engine shell, the propane is changed in the coils 64 to a gas, which is forced through the injection nozzle 48 by the original back pressure from the tank 50.

My present jet engine is initially ignited by means of a spark plug 70, which I presently prefer to place in tail pipe 20 just to the rear of the tapered rear section 18 of shell 12. The spark is supplied through ignition wire 72 from a suitable source of electrical current supply.

I presently prefer to construct my jet engine principally from stainless steel, although any other suitable metal may be used, such as, for example, titanium. Thus, in my presently preferred embodiment of my jet engine 10, the combustion chamber shell 12, the nose section 16, the tapered rear section 18 of shell 12, the tail pipe 20, the diffuser skirt 28, the diffuser or third supercharger stage, and the superheater coils 64 will all be constructed from stainless steel, as these parts are subject to relatively high temperatures.

My jet engine 10 is particularly adapted for use as the power plant for a helicopter, in which use the engine 10 is mounted at the tip of a helicopter rotor blade shown in phantom at 74. The forward portions of the first, second and third supercharger stages 42, 36 and 30, respectively, may form the leading portion of the helicopter blade airfoil section, if desired. Alternatively, the supercharger stages 42, 36 and 30 may be enshrouded in the forward edge of the blade, with the scoops 40 and 46 projecting forwardly of the blade, and with an opening in the blade for the open end of third supercharger stage 30.

The fuel lines 56 and 66, the nozzle pressure pickup line 68, and the ignition wire 72 will all be encased within the helicopter blade.

Referring now to the operation of my present invention, when both the shut-off valve 54 and the throttle valve 58 are open, liquid propane under a normal pressure of between 98 and 100 pounds per square inch is forced through the liquid fuel line 56, this liquid fuel being ejected through spray nozzle 60 which pulverizes the propane into the fuel line 62 and and hence into the superheater coils 64, where the liquid changes into a gas, which is forced by the original back pressure through gas fuel line 66, to be injected into the first supercharger stage 42 through injection nozzle 48.

Injection nozzle 48 is a supersonic nozzle, and the gas stream from nozzle 48 moving at supersonic speeds creates a vacuum in the scoop 46, pulling in outside air which mixes with the gaseous fuel in the first supercharger stage 42, imparting its energy to the mixed stream of air and gaseous fuel.

This mixed stream of gaseous fuel and air enters from the first supercharger stage 42 into the larger duct of second supercharger stage 36, where again the high speed flow creates a partial vacuum in scoop 40 and second supercharger stage 36 to draw in further outside air, which is mixed with the stream in the second supercharger stage 36.

This mixture of gaseous fuel and air is then fed into the third supercharger stage or diffuser 30 from second supercharger stage 36, again producing a partial vacuum in third supercharger stage 30 to induce further air into the mixture through the open end of third supercharger stage 30. At this stage the fuel to air ratio has reached a combustible mixture of one part fuel to 14.5 parts air, by weight.

This stream of explosive mixture expands as it passes through diffuser 30 and diffuser skirt 28, due to the increasing cross-sectional area in diffuser 30 and diffuser skirt 28. This slowing down of the velocity of the combustible fuel mixture occurs primarily in the diffuser skirt 28, where the cross-sectional area increases rapidly.

At some point in the diffuser skirt 28 the explosive mixture will be slowed down to the speed of flame propagation, at which point the explosive mixture will catch fire. During the process of slowing down to the point where the speed of flame propagation is reached, the velocity energy of the combustible fuel is transformed into pressure energy, which becomes the combustion pressure.

In order to start the opeartion of my jet engine 10, after the fuel has thus been provided to the engine, the combustible mixture is ignited by means of spark plug 70.

The expanding exhaust gasses from the combustion are forced out through the tail pipe 20, to provide the jet thrust.

Some of the heat from the combustion is transferred to the superheater coils 64, and hence to the fuel inside of coils 64, thus raising the temperature of the gaseous fuel to a desired operating temperature of one thousand degrees F. (1000° F.) at which the fuel is injected through nozzle 48.

My present jet engine 10 will normally not operate if the temperature of the gaseous fuel injected through nozzle 48 is below three hundred degrees F. (300° F.), and a temperature of at least six hundred fifty degrees F. (650° F.) is required for satisfactory operation.

The propane, beside being vaporized and dried in the superheater coils 64, breaks down to propeline, which requires less air than propane to burn, so that when operating temperatures are reached, the fuel to air ratio may increase (having a higher percentage of fuel) above the initial ignition ratio of one part of fuel to 14.5 parts of air.

The principal reason for superheating the gas in superheater coils 64 is to prevent the gas from reaching the saturated vapor state when the gas cools due to expansion as it passes out of the supersonic nozzle 48. Thus, if propane gas which is not superheated is allowed to expand through a supersonic nozzle, it will normally follow the saturated vapor curve, so that it will be almost in a liquid state as it leaves the nozzle. This is undesirable, because a liquid stream can never induce enough air to support combustion.

By superheating the gas before injecting it through the supersonic nozzle 48, the gas expanding through the nozzle 48 will follow a line of constant entropy. I superheat the fuel sufficiently to prevent the gas from reaching the saturation point on expansion when leaving the injection nozzle 48.

It should be noted that superheating of propane such as I accomplish in my coils 64 cannot be accomplished in a fuel tank, as the propane will always follow the saturation line during temperature and pressure increases in the fuel tank.

By pulverizing the propane through the spray nozzle 60, there will be no liquid present in the superheating coils 64, whereby the proper drying and superheating of the gas will occur in the superheater coils 64.

I have disposed my superheating coils 64 just inside of the critical structural point in the engine shell. The shell section 18, without the coils 64 present, would get so hot that the metal may not be able to withstand the thermal fatigue and also the centrifugal force from rotation of the engine on the helicopter blade, which tends to flatten out the shell. By placing my superheater coils 64 at this point, the coils 64 act as a shield against such excessive heat from the combustion chamber 14, and also the coils 64 expand against the wall of shell section 18 when they are hot to act as stiffening bulkheads to keep the desired circular cross-sectional shape.

Also, by providing the forward portion 22 of tail pipe 20 within the shell section 18, the temperature of the outside shell is considerably lower at this critical point, and hence better able to withstand the stresses resulting from centrifugal forces.

The length of tail pipe 20 is not in any way critical in my present jet engine, as it was in the valveless pulse jet type of engine. However, it is desirable to have tail pipe 20 sufficiently long to permit the entire expansion of the burning gasses to occur within the engine. I presently prefer to determine the optimum tail pipe length experimentally for each engine by providing an adjustable extension (not shown) on the tail pipe which may be slideably moved to adjust the length of the tail pipe during tests. When the optimum length has been determined, the slidable member may be removed, and a permanent piece of the determined length may be welded into place at the rear of the tail pipe.

High engine thrust in my present invention depends upon the provision of a high nozzle pressure at the injection nozzle 48, to provide a large momentum of the injected gaseous stream from nozzle 48. Under static conditions the pressure at injection nozzle 48 will be on the order of one hundred forty (140) pounds per square inch. However, during operation of my jet engine 10 at the tip of the helicopter blade, the centrifugal force on the fuel will permit nozzle pressures of between six hundred (600) and seven hundred (700) pounds per square inch to be reached. By combining such high nozzle pressures with the superheated gaseous fuel, the fuel is injected at low density and very high velocity, thereby obtaining a maximum of momentum. Under the principle of conservation of momentum, most of this momentum will be retained in the first and second supercharger stages 42 and 36, respectively, with the velocity being successively decreased in the first and second supercharger stages 42 and 36, but with the mass being successively increased, due to the introduction of air.

The second supercharger stage 36 thus is, in effect, an inertia tube which functions in much the same manner as the flywheel of the conventional internal combustion engine, in the hereinafter described manner.

The unsteady, slightly fluctuating flame front 76 in diffuser skirt 28 sets up a vibration of the gas column which reverberates through the tail pipe 20 establishing a somewhat pulsating flow at certain harmonic frequencies. In contrast to the pulsations of the valveless pulse jet, these harmonic pulsations of my present jet engine are undesired. These unwanted pulsations or shock waves tend to penetrate into the diffuser 30 as shock waves or pressure reversals, which tend to stop or slow down the flow of incoming gas and air.

By providing the flared end 32 of diffuser 30, these reverse pulses are permitted to exhaust themselves out through the flare 32, thus minimizing the resistance to the incoming fresh charge of fuel and air.

The inertia and kinetic energy of the stream of gas and air flowing toward the combustion chamber through the second supercharger stage 36 will overpower the shock or pressure reversals in the diffuser section 30, to keep the flow of incoming fuel to the engine in the right direction. Hence, the inertia tube 36 may be considered as functioning in much the same manner as an ordinary flywheel, in that it overcomes merely temporary or fluctuating reversals.

In my present jet engine 10, the reverberations tend to grow stronger and stronger as the jet power increases, with the corresponding increase of pressure in the combustion chamber 14. When maximum jet thrust is reached, the flow tends to go both ways, and at this point the inertia and kinetic energy of the flow through second supercharger stage 36 keeps the fuel flowing in the right direction, and thereby keeps the engine in operation.

Although the length of second supercharger stage 36 will vary for engines of different sizes and shapes, the second supercharger stage 36 must be sufficiently long so that the momentum and kinetic energy of the gas flowing through the tube 36 will overpower the temporary reversals in diffuser 30. However, as heretofore mentioned, I have found experimentally that the length of second supercharger stage 36 must be at least substantially equal to the distance from the opening of diffuser 30 to the opposite wall of the combustion chamber 14.

I further break the shock or pressure waves tending to pass outwardly through diffuser 30 by providing the small hole 34 in diffuser 30. The small hole 34 allows the temporary pressure build-ups to dissipate themselves before reaching the open end of diffuser 30.

Thus, when the engine is operating at high thrust, and the shock reversals are strong, part of the shock wave will be dissipated by the opening 34, acting as a damper, another part will be escaping out through the open end of diffuser 30, while the remainder of the shock will be absorbed in the gas and air column in the outer end of second supercharger stage 36. When this shock wave has thus dissipated itself, the inertia of the gaseous mixture flowing through tube 36 will cause the fuel and air to flow on into the diffuser 30.

Although I am not certain as to the exact reason why the inertia tube 36 must be at least substantially as long as the distance from the flared opening of diffuser 30 to the opposite wall 37 of the combustion chamber, it presently appears that the shocks from flame front 76 will set up a standing quarter wave having a node at the flared opening of diffuser 30, and having its highest amplitude at the wall 37 of the combustion chamber where it is reflected back. This wave will continue on out into the inertia tube 36, but because of the much lower average temperature in inertia tube 30 as compared with the average temperature in the region of the combustion chamber 14 and diffuser 30, the wave length of this shock wave in inertia tube 30 will be approximately one-half the wave length of the standing quarter wave in the diffuser 30 and combustion chamber 14. This results in a standing half wave in inertia tube 36. In order for this half wave to properly resonate in inertia tube 36, the tube 36 must be at least as long as the standing quarter wave between the flared open end of diffuser 30 and the combustion chamber wall 37, and may be even longer. This resonant standing wave in inertia tube 36 greatly assists in preventing unwanted shock reversals from interfering with the flow of fuel and air into diffuser 30.

I have found that the small hole 34 in diffuser 30 substantially destroys the noise or shock wave pressure before it reaches the flared opening of diffuser 30, so that this noise or shock wave does not interfere nearly so much with the incoming fuel and air. I have also found that the small hole 34 causes the pressure within the combustion chamber 14 to increase, thereby increasing the combustion efficiency, while at the same time causing a further reduction in the pressure in the second supercharger stage 36, which tends to assist the flow of fuel and air through the second supercharger stage 36.

In one embodiment of my present invention I have found experimentally that by adding the small hole 34 in diffuser 30 I was able to increase the engine thrust from ten (10) pounds to sixteen (16) pounds.

Although dimensions are not critical in my present invention except as hereinabove pointed out, it may be noted that one successfully operating embodiment of my present invention employed a second supercharger stage 36 having a length of ten and seven-eighths inches, with this same distance from the outer combustion chamber wall 37 to the flared opening of diffuser 30. In this embodiment the distance from the end of tail pipe 20 to a center line through the three supercharger stages and the combustion chamber was twenty-eight and one-fourth inches.

It will thus be seen that my present jet engine 10 operates in a manner which is completely opposite to the operation of the prior art valveless pulse jet engine, in that the valveless pulse type of jet engine depends for its operation upon establishing resonating sound or shock waves, whereas my present invention establishes its flame front without these sound or shock waves by the use of a high speed, high momentum jet stream, the present invention being particularly constructed and arranged to minimize interference by incidental shock or noise waves which arise during operation. By providing a high speed, high inertia intake system, I provide a fuel mixture to the combustion area of the engine which is under sufficient pressure to ignite when it slows down to the speed of flame propagation, while at the same time overcoming any incidental, unwanted shock waves which tend to reverse this flow of incoming fuel mixture.

It is to be understood that the form of my invention herein shown and described is my preferred embodiment and that various changes in the shape, size and arrangement of parts may be resorted to without departing from the spirit of my invention, or the scope of my appended claims.

I claim:

1. A jet propulsion system including a casing having internal wall means defining a combustion zone and inlet and exhaust passages, means for initially igniting fuel in said combustion zone, means for injecting a gaseous fuel-air mixture into said inlet passage at a velocity greater than the speed of flame propagation for said fuel-air mixture, the cross-sectional area of said inlet passage enlarging toward said combustion zone whereby the pressure of said fuel-air mixture will increase and the velocity of said fuel-air mixture will slow down until it reaches the speed of flame propagation as it enters said combustion zone, at which point the fuel-air mixture will be conditioned to ignite, said fuel-air mixture injecting means including an inertia tube substantially aligned with said inlet passage through which the fuel-air mixture flows immediately prior to entering said inlet passage, said inertia tube being of such length that the momentum of fuel-air mixture flow through said inertia tube tends to overcome momentary pressure reverses at the opening of said inlet passage, said inlet and exhaust passage being at substantially right angles to each other, and a small shock wave dissipating hole extending through the wall of said inlet passage at substantially the longitudinal center of said inlet passage.

2. The device of claim 1 in which said hole has a diameter in the range of from .020 inch to .040 inch.

3. A jet propulsion system including a casing having internal wall means defining a combustion zone and inlet and exhaust passages disposed substantially at righ angles to each other, means for initially igniting fuel in said combustion zone, means for injecting a gaseous fuel-air mixture into said inlet passage at a velocity greater than the speed of flame propagation for the fuel-air mixture, the cross-sectional area of said inlet passage enlarging toward said combustion zone whereby the pressure of said fuel-air mixture will increase and the velocity of the fuel-air mixture will slow down until it reaches the speed of flame propagation as it enters said combustion zone, at which point the fuel-air mixture will be conditioned to ignite, said fuel-air injecting means including a source of supply of liquid propane under pressure, a superheater tube disposed in a high temperature region within said casing, a fluid connection between said source of liquid propane and one end of said superheater tube, a supersonic injection nozzle operatively connected to the other end of said superheater tube, a plurality of supercharger stages between said supersonic injection nozzle and said inlet passage for inducing ambient air into the fuel flow stream, the propane becoming superheated in the gaseous state in said superheater tube whereby the propane will remain in the gaseous state through said supercharger stages, said supercharger stages including an inertia tube substantially aligned with said inlet passage through which the fuel flows immediately prior to entering the inlet passage, the momentum of fuel flow through said inertia tube overcoming momentary pressure reverses in said inlet passage, and a small shock wave dissipating hole extending through the wall of said inlet passage at substantially the longitudinal center of said inlet passage.

4. The device of claim 3 in which said shock wave dissipating hole has a diameter of from .020 to .040 inch.

5. The device of claim 3 in which the length of said inertia tube is at least substantially equal to the distance from the end of the inlet passage to the internal wall of said casing opposite said inlet passage.

6. The device of claim 5 in which said shock wave dissipating hole has a diameter of from .020 to .040 inch.

7. A jet propulsion system including a casing having internal wall means defining a combustion zone and inlet and exhaust passages disposed substantially at right angles to each other, means for initially igniting fuel in said combustion zone, means for injecting a gaseous fuel-air mixture into said inlet passage at a velocity greater than the speed of flame propagation for said fuel-air mixture, the cross-sectional area of said inlet passage enlarging toward said combustion zone whereby the pressure of said fuel-air mixture will increase and the velocity of said fuel-air mixture will slow down until it reaches the speed of flame propagation as it enters said combustion zone, at which point the fuel-air mixture will be conditioned to ignite, said fuel-air mixture injecting means including an inertia tube substantially aligned with said inlet passage through which the fuel-air mixture flows immediately prior to entering said inlet passage, the momentum of fuel-air mixture flow through said inertia tube tending to overcome momentary pressure reverses at the opening of said inlet passage, said inertia tube being sufficiently long to comprise at least a half wave resonator for a noise frequency that resonates at a quarter wave length between the open end of said inlet passage and the internal wall of said casing opposite said inlet passage.

8. A jet propulsion system including a casing having internal wall means defining a combustion zone and inlet and exhaust passages disposed substantially at right angles to each other, means for initially igniting fuel in said combustion zone, means for injecting a gaseous fuel-air mixture into said inlet passage at a velocity greater than the speed of flame propagation for the fuel-air mixture, the cross-sectional area of said inlet passage enlarging toward said combustion zone whereby pressure of said fuel-air mixture will increase and the velocity of the fuel-air mixture will slow down until it reaches the speed of flame propagation as it enters said combustion zone, at which point the fuel-air mixture will be conditioned to ignite, said fuel-air mixture injecting means including a source of supply of liquid propane under pressure, a superheater tube disposed in a high temperature region within said casing, a fluid connection between said source of liquid propane and one end of said superheater tube, a supersonic injection nozzle operatively connected to the other end of said superheater tube, and a plurality of supercharger stages between said supersonic injection nozzle and said inlet passage for inducing ambient air into the fuel flow stream, the propane becoming superheated in the gaseous state in said superheater tube whereby the propane will remain in the gaseous state through said supercharger stages, said supercharger stages including an inertia tube substantially aligned with said inlet passage through which the fuel-air mixture flows immediately prior to entering the inlet passage, said inertia tube being of such length that the momentum of fuel flow through said inertia tube tends to overcome momentary pressure reverses in said inlet passage, said inertia tube being sufficiently long to comprise at least a one-half wave resonator for a noise frequency that resonates at a quarter wave length between the open end of said inlet passage and the internal wall of said casing opposite said inlet passage.

References Cited in the file of this patent

UNITED STATES PATENTS

| | | |
|---|---|---|
| 2,485,502 | McCollum | Oct. 18, 1949 |
| 2,663,142 | Wilson | Dec. 22, 1953 |
| 2,720,754 | Francois | Oct. 18, 1955 |
| 2,731,795 | Bodine | Jan. 24, 1956 |
| 2,795,105 | Porter | June 11, 1957 |
| 2,796,734 | Bodine | June 25, 1957 |

FOREIGN PATENTS

| | | |
|---|---|---|
| 50,033 | France | Aug. 1, 1939 |
| | (Addition to 799,655) | |
| 1,011,439 | France | Apr. 2, 1952 |
| 738,239 | Germany | Aug. 6, 1943 |

OTHER REFERENCES

Diedrich: "The Aero Resonator Power Plant of the V-1 Flying Bomb," United States Navy Project Squid, Technical Memorandum No. Pr-4, pp. 63-64, June 30, 1948.